(12) United States Patent
Katsumata (10) Patent No.: US 9,085,280 B2
(45) Date of Patent: Jul. 21, 2015

(54) VEHICLE SIDE AIRBAG DEVICE

(71) Applicant: Shunichi Katsumata, Susono (JP)

(72) Inventor: Shunichi Katsumata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/184,375

(22) Filed: Feb. 19, 2014

(65) Prior Publication Data

US 2014/0239618 A1 Aug. 28, 2014

(30) Foreign Application Priority Data

Feb. 26, 2013 (JP) .................................. 2013-036245

(51) Int. Cl.
*B60R 21/16* (2006.01)
*B60R 21/2342* (2011.01)
*B60R 21/231* (2011.01)

(52) U.S. Cl.
CPC ....... *B60R 21/2342* (2013.01); *B60R 21/23138* (2013.01); *B60R 2021/23146* (2013.01)

(58) Field of Classification Search
USPC ........................................... 280/730.2, 743.2
See application file for complete search history.

(56) References Cited

U.S. PATENT DOCUMENTS

| | | | | |
|---|---|---|---|---|
| 6,916,039 | B2* | 7/2005 | Abe | 280/729 |
| 7,661,702 | B2* | 2/2010 | Ochiai et al. | 280/730.2 |
| 7,976,058 | B2* | 7/2011 | Suzuki et al. | 280/729 |
| 8,033,570 | B2* | 10/2011 | Sato et al. | 280/730.2 |
| 8,226,114 | B2* | 7/2012 | Shimono | 280/730.2 |
| 8,714,584 | B2* | 5/2014 | Honda et al. | 280/729 |
| 8,720,940 | B2* | 5/2014 | Honda et al. | 280/730.2 |
| 8,783,712 | B2* | 7/2014 | Fukushima et al. | 280/730.2 |
| 2006/0131847 | A1* | 6/2006 | Sato et al. | 280/730.2 |
| 2008/0231026 | A1 | 9/2008 | Naito et al. | |
| 2011/0241322 | A1 | 10/2011 | Nozaki et al. | |
| 2012/0043741 | A1 | 2/2012 | Yamamoto | |
| 2014/0035264 | A1* | 2/2014 | Fukushima et al. | 280/730.2 |

FOREIGN PATENT DOCUMENTS

| | | |
|---|---|---|
| JP | 2000-280853 A | 10/2000 |
| JP | 2006-082664 A | 3/2006 |
| JP | 2008-230406 A | 10/2008 |
| JP | 2010-188891 A | 9/2010 |
| JP | 2011-051414 A | 3/2011 |
| WO | 2010076881 A1 | 7/2010 |
| WO | 2010131518 A1 | 11/2010 |
| WO | 2014013822 A1 | 1/2014 |

* cited by examiner

*Primary Examiner* — Toan To
(74) *Attorney, Agent, or Firm* — Gifford, Krass, Sprinkle, Anderson & Citkowski, P.C.

(57) ABSTRACT

A vehicle side airbag device includes: an inflator provided in a side portion on an outside, in a vehicle width direction, of a seat back of a vehicle seat, and generating gas by being activated when a vehicle side collision is detected or anticipated; and a side airbag provided in the side portion, and having front and rear bag portions, the side airbag being inflated and deployed by the gas from the inflator, a shoulder restraining portion provided in an upper portion of the rear bag portion being interposed between a shoulder of a seated occupant and a vehicle body side portion, and an inflated thickness in the vehicle width direction of a region that includes the shoulder restraining portion being expanded by an inflation-suppressing sewn portion applied to the region fraying or tearing due to an increase in internal pressure of the rear bag portion.

20 Claims, 7 Drawing Sheets

VEHICLE SIDE AIRBAG DEVICE

INCORPORATION BY REFERENCE

The disclosure of Japanese Patent Application No. 2013-036245 filed on Feb. 26, 2013 including the specification, drawings and abstract is incorporated herein by reference in its entirety.

BACKGROUND OF THE INVENTION

1. Field of the Invention

The invention relates to a vehicle side airbag device that restrains a seated occupant by a side airbag in the event of a side collision of a vehicle.

2. Description of Related Art

A side airbag device described in International Publication No. WO 2010/076881 includes a left-right two-chamber side airbag. This side airbag has a third base fabric sandwiched between a first base fabric on an occupant side and a second base fabric on a door side, such that a first bag half on the occupant side and a second bag half on the door side are formed. Gas from an inflator is supplied to this second bag half, and gas is supplied to the first bag half via a communication hole formed in an end portion, on a side away from the inflator, of the third base fabric. As a result, first the second bag half is inflated and deployed to ensure the minimum required occupant restraint performance, and then the first bag half is deployed. That is, when the second bag half inflates and deploys, it (i.e., the second bag half) is able to deploy smoothly without interfering with the occupant, by a thickness of the second bag half in a vehicle width direction being set small. Then sufficient thickness in the vehicle width direction of the entire side airbag is ensured by completing the inflation and deployment of the first bag half, thereby increasing the occupant restraint performance.

Meanwhile, with a side airbag device described in Japanese Patent Application Publication No. 2011-051414 (JP 2011-051414 A), a side airbag is a left-right independent two-chamber side airbag that is provided with a small first airbag that inflates and deploys between a shoulder of an occupant and a side door, and a large airbag that is sewn to the side door-side of the first airbag. The first airbag finishes inflating and deploying before the second airbag does, and a horizontal cross-section after inflation and deployment is formed in a tapered shape on a front side. As a result, even if a space between the occupant and the side door is narrow in a compact vehicle or the like, the side airbag will inflate and deploy stably by first inflating and deploying the first airbag in the space, and then inflating and deploying the second airbag.

However, with each of the side airbag devices described in the publications described above, the structure of the airbag is complex. Therefore, many base fabrics are required, and the sewing work is complicated, which leads to an increase in the manufacturing cost. Moreover, when folded, the side airbag is bulky and may not be able to be housed in a compact vehicle seat.

SUMMARY OF THE INVENTION

The invention thus provides a vehicle side airbag device capable of both ensuring good deployment performance of a side airbag even when a space between a seated occupant and a vehicle body side portion is narrow, and simplifying the structure of the side airbag.

One aspect of the invention relates to a vehicle side airbag device that includes an inflator that is provided in a side portion on an outside, in a vehicle width direction, of a seat back of a vehicle seat, and that generates gas by being activated when a side collision of a vehicle is detected or anticipated; and a side airbag that is provided in the side portion, and that has a front bag portion and a rear bag portion that are partitioned by a partitioning portion. The side airbag is inflated and deployed by the gas from the inflator that is housed in a rear portion inside the rear bag portion being supplied into each bag portion. A shoulder restraining portion provided in an upper portion of the rear bag portion extends toward a vehicle front side on an upper side of the front bag portion and is interposed between a shoulder of a seated occupant and a vehicle body side portion. An inflated thickness in the vehicle width direction of a region that includes the shoulder restraining portion of the rear bag portion is expanded by an inflation-suppressing sewn portion applied to the region fraying or tearing due to an increase in internal pressure of the rear bag portion.

The front, rear, up, and down directions in this aspect are directions when the side airbag is in an inflated and deployed state, and correspond to the front, rear, up, and down directions of the vehicle. This is the same for the other aspects of the invention as well.

In the aspect described above, the side airbag has the front bag portion and the rear bag portion that are partitioned by the partitioning portion. The inflator is housed in the rear portion in the rear bag portion. When a side collision of the vehicle is detected or anticipated, the inflator is activated. Then gas generated by the inflator is supplied into the bag portions such that the side airbag inflates and deploys. The shoulder restraining portion provided in the upper portion of the rear bag portion extends toward the vehicle front side on the upper side of the front bag portion, and is interposed between the shoulder of the seated occupant and the vehicle body side portion.

Here, the inflation-suppressing sewn portion is applied to the region that includes the shoulder restraining portion of the rear bag portion. When the internal pressure of the rear bag portion increases, this inflation-suppressing sewn portion frays or tears such that the inflated thickness in the vehicle width direction of the region expands. That is, until the inflation-suppressing sewn portion frays or tears, the capacity and inflated thickness in the vehicle width direction of the shoulder restraining portion are small. Therefore, the shoulder restraining portion is able to be deployed particularly well in the narrow space between the shoulder of the seated occupant and the vehicle body side portion. As a result, good deployment performance of the side air bag is able to be ensured. Moreover, the effects described above are able to be obtained with a simple structure in which the inflation-suppressing sewn portion is applied to the shoulder restraining portion of the rear bag portion, so the structure of the side airbag is able to be simplified.

As described above, with the vehicle side airbag device according to the aspect of the invention described above, good deployment performance of the side airbag is able to be ensured even when the space between the seated occupant and the vehicle body side portion is narrow, and the structure of the side airbag is able to be simplified.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

A vehicle side airbag device 10 according to a first example embodiment of the invention will now be described with reference to FIGS. 1 to 5. In the drawings, the arrow FR indicates a forward direction (advancing direction) of a vehicle, the arrow UP indicates an upward direction with respect to the vehicle, and the arrow OUT indicates the outside in the vehicle width direction. Hereinafter, in descriptions using simply the longitudinal (front-rear) and up-down directions, these will be indicated as front or rear in the longitudinal direction of the vehicle and up or down in the up-down direction of the vehicle, unless otherwise specified.
(Structure)

Figure 1:
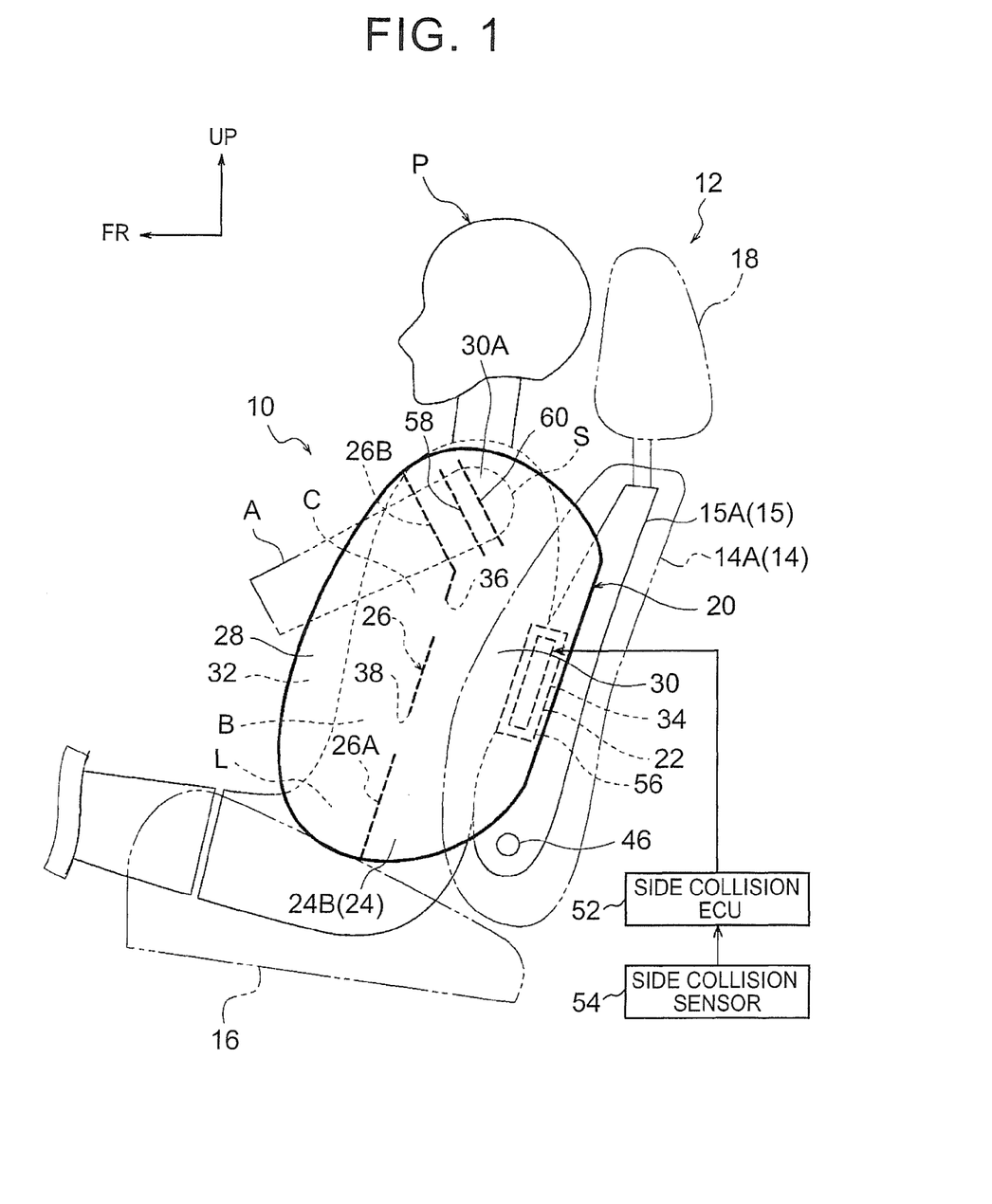
FIG. 1 is a side view of a vehicle seat equipped with a vehicle side airbag device according to a first example embodiment of the invention, in which a side airbag is in a partially inflated and deployed state.
Figure 4:
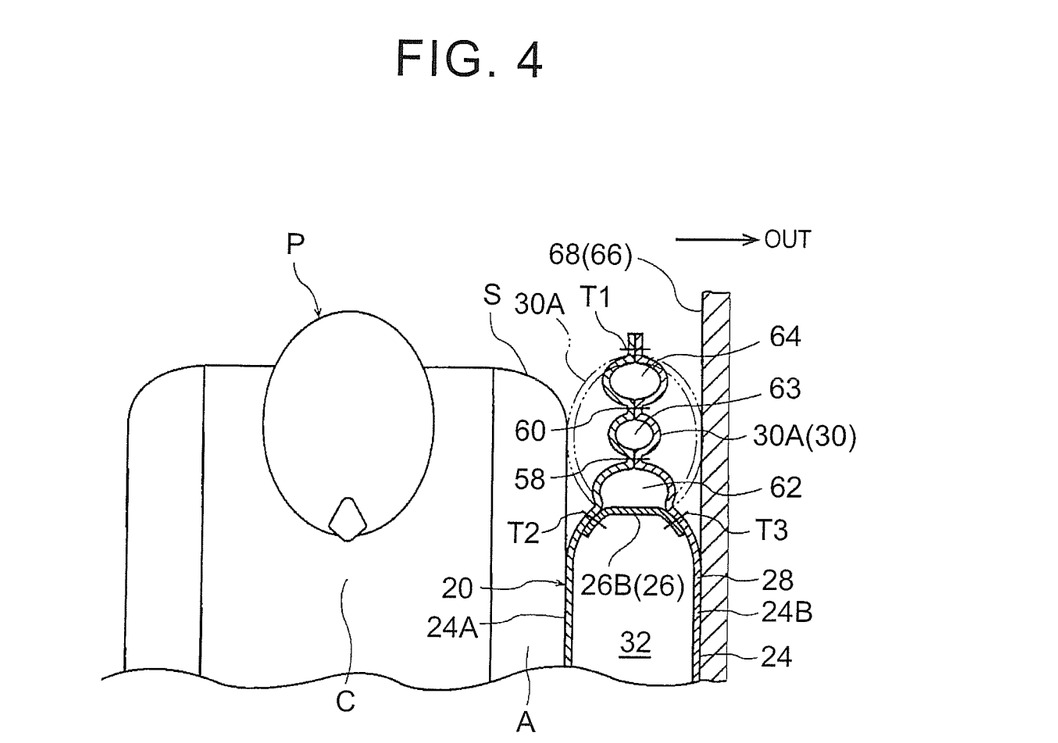
FIG. 4 is a sectional view of cross-section taken along line IV-IV in FIG. 2.

As shown in FIG. 1, the vehicle side airbag device 10 according to the first example embodiment is mounted in a door-side side portion 14A (a side portion on the outside in the vehicle width direction; a side portion on a side door 66 side shown in FIG. 4) of a seat back 14 of a vehicle seat 12. This seat back 14 is tiltably connected to a rear end portion of a seat cushion 16, and a headrest 18 is connected to an upper end portion of the seat back 14.

In this example embodiment, the front-rear (longitudinal) direction, the left-right (width) direction, and the up-down direction of the vehicle seat 12 match the front-rear (longitudinal) direction, the left-right (width) direction, and the up-down direction of the vehicle. Also, in FIG. 1, a crash test dummy P, instead of an actual person, is seated in the vehicle seat 12. This dummy P is a WorldSID (World Side Impact Dummy) AM50 (i.e., a model covering 50% of American adult males), for example. Hereinafter, the dummy P will be referred to as "seated occupant P" to facilitate understanding of the description.

The vehicle side airbag device 10 includes a side airbag 20, and an inflator 22 (gas generating means) that generates gas inside the side airbag 20, as main components. The side airbag 20 is arranged (housed) inside of the door-side side portion 14A in a state folded up and unitized (i.e., integrated) with the inflator 22 and the like, and inflates and deploys between the seated occupant P and a door trim 68 (see FIG. 4) of the side door 66 by the pressure of the gas generated by the inflator 22. When the side airbag 20 inflates and deploys, a seat back pad 17 (see FIG. 3) and a seat cover (not shown) receive expansion pressure of the side airbag 20 and tear. Unless otherwise specified, the front, rear, up, and down directions of the side airbag 20 described in the description below indicate directions when the side airbag 20 is in an inflated and deployed state, and substantially match the front, rear, up, and down directions of the seat back 14.

As shown in FIGS. 1 to 5, the side airbag 20 is a so-called twin chamber side airbag, and is formed in a bag shape by a single piece of base fabric 24 that is cut out of nylon or polyester cloth material being sewn to itself. This base fabric 24 is folded in two along a fold line K, then one side portion 24A and the other side portion 24B are overlapped through this fold line K, and outer peripheral edge portions are sewn together at a seam T1 (not shown in FIGS. 1 and 2). The side airbag 20 may also be formed by two pieces of base fabric being overlapped and the outer peripheral edge portions being sewn together.

Figure 2:
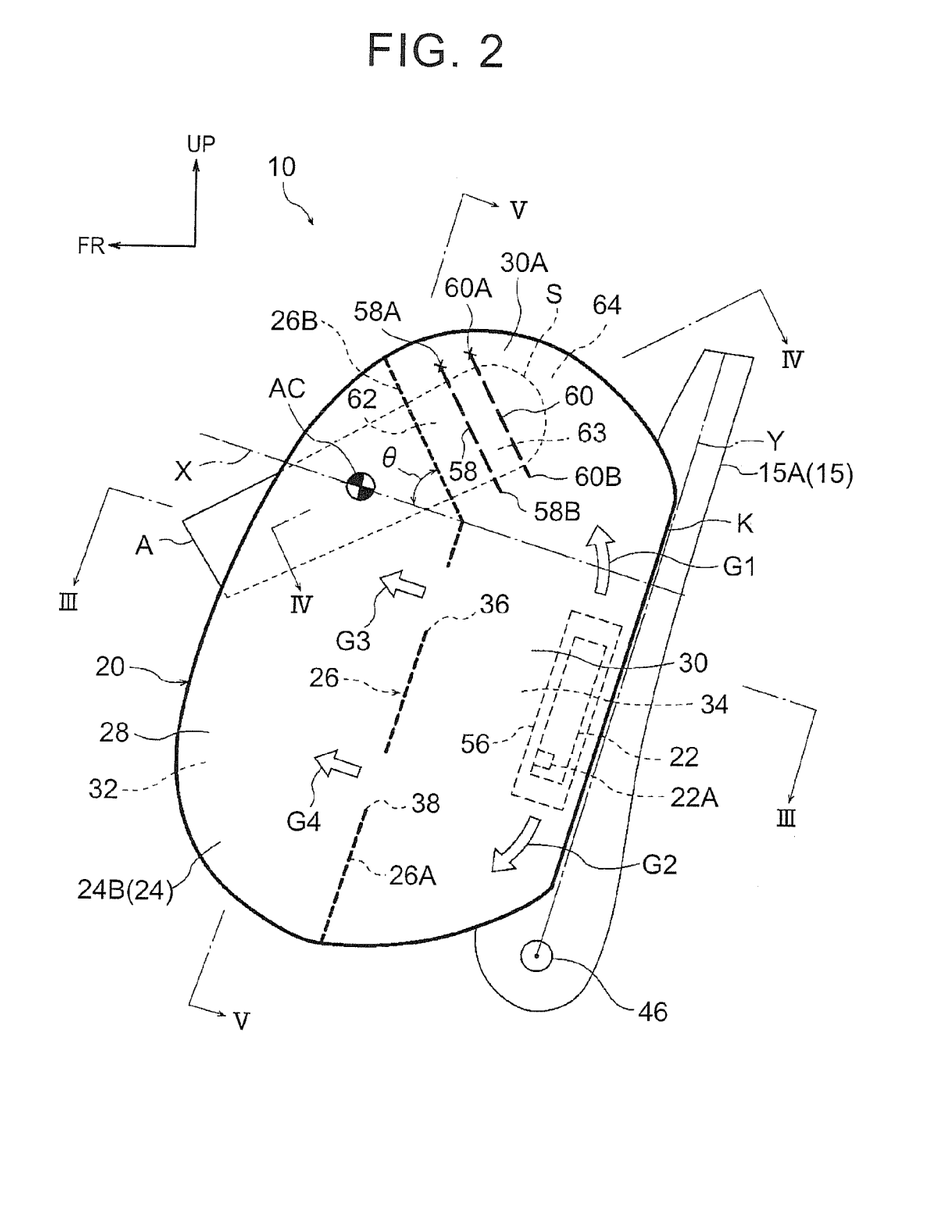
FIG. 2 is an enlarged side view of the side airbag according to the first example embodiment of the invention.

This side airbag 20 is arranged such that, when in an inflated and deployed state, the one side portion 24A of the base fabric 24 faces the inside (i.e., the side with the seated occupant P) in the vehicle width direction, and the other side portion 24B of the base fabric 24 faces the outside (i.e., the side with the side door 66) in the vehicle width direction. Also, when this side airbag 20 in an inflated and deployed state is viewed from the side, as is shown in FIGS. 1 and 2, the side airbag 20 forms a long, generally oval shape in a seat back height direction, and is formed large enough to be able to restrain a shoulder S, chest C, abdomen B, and hip L of the seated occupant P.

The inside of the side airbag 20 is partitioned (i.e., divided) by a tether 26 (partition cloth) that is a partitioning portion. This tether 26 is formed in a long band shape by the same cloth material as that of the base fabric 24. One long side edge portion is sewn to the one side portion 24A of the base fabric 24 at a seam T2, and the other long edge portion is sewn to the other side portion 24B of the base fabric 24 at a seam T3 (see FIGS. 3 to 5; not shown in FIGS. 1 and 2). The tether 26 is formed by an up-down partitioning portion 26A that extends in the seat back height direction from a middle portion to a lower portion in the up-down direction of the side airbag 20, and an upper partitioning portion (i.e., an inclined partitioning portion) 26B that extends upward at a forward angle with respect to the seat back 14 from an upper end of the up-down partitioning portion 26A, thus partitioning the side airbag 20 into a front bag portion 28 and a rear bag portion 30.

The inside of the front bag portion 28 serves as a front chamber 32, and the inside of the rear bag portion 30 serves as a rear chamber 34. The front chamber 32 and the rear chamber 34 are communicated together via a one or a plurality of communication holes (a pair of upper and lower holes in this case) 36 and 38 formed in the up-down partitioning portion 26A.

When the side airbag 20 in an inflated and deployed state is viewed from the vehicle width direction, the up-down partitioning portion 26A is set so as to extend from a position overlapping a hip point of the seated occupant P toward the center of the shoulder S, to near an area below an armpit. The position of the center of the shoulder S is a position of an axial center of a bolt provided in the shoulder S of the dummy P.

Figure 3:
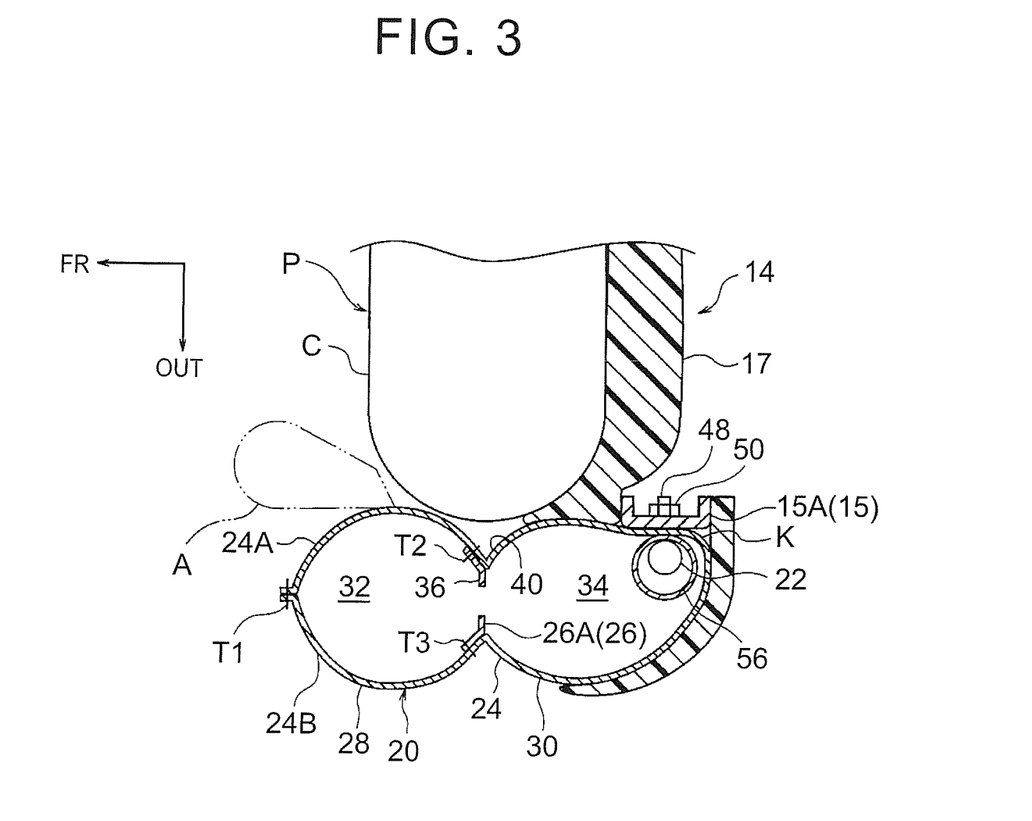
FIG. 3 is a sectional view of a cross-section taken along line III-III in FIG. 2.

When the side airbag 20 is in an inflated and deployed state, this up-down partitioning portion 26A is provided opposing longitudinally middle portions of the chest C, abdomen B, and hip L of the seated occupant P, and is configured such that front portions (front half portions) of the chest C, abdomen B, and hip L of the seated occupant P are restrained by the front bag portion 28, while rear portions (rear half portions) of the chest C, abdomen B, and hip L of the seated occupant P are restrained by the rear bag portion 30. A recessed portion 40 in which an inside surface, in the vehicle width direction, of the side airbag 20 is recessed toward the outside in the vehicle width direction is formed near the up-down partitioning portion 26A, as shown in FIG. 3. This recessed portion 40 extends in the seat back height direction along the up-down partitioning portion 26A. This recessed portion 40 opposes a longitudinally central portion (i.e., a portion that protrudes farthest to the outside in the vehicle width direction) of the chest C.

Meanwhile, the upper partitioning portion 26B is inclined so as to rise toward the side in front of the seat back 14, with respect to a direction (the direction along the alternate long and short dash line X in FIG. 2) orthogonal to a height direction (the direction along the alternate long and short dash line Y in FIG. 2) of the seat back 14 when viewed from the longitudinal (i.e., front-rear) direction of the seat back 14 (i.e., from the side of the seat). The height direction of the seat back 14 is a direction that connects an axial center of a reclining rod 46 with a longitudinal center (i.e., the center in the front-rear direction) of an upper end portion of a seat back frame 15. Also, in this example embodiment, an inclination angle θ of the upper partitioning portion 26B with respect to the longitudinal (i.e., front-rear) direction of the seat back 14 may be set to within a range from 30 to 60 degrees, inclusive, and more preferably, to within a range from 40 to 50 degrees, inclusive.

When the side airbag 20 in an inflated and deployed state is viewed from the vehicle width direction, this upper partitioning portion 26B is set so as to be positioned near the center between the center of the shoulder S of the seated occupant P and the center portion in the length direction of an upper arm A (i.e., a position of the center of gravity AC of the upper arm A or a position near the center of gravity AC). By setting this upper partitioning portion 26B, a shoulder restraining portion 30A that is separated from the front bag portion 28 is formed in an upper portion of the rear bag portion 30. This shoulder restraining portion 30A extends forward toward the front of the vehicle above the front bag portion 28 and restrains the shoulder S of the seated occupant P.

Figure 5:
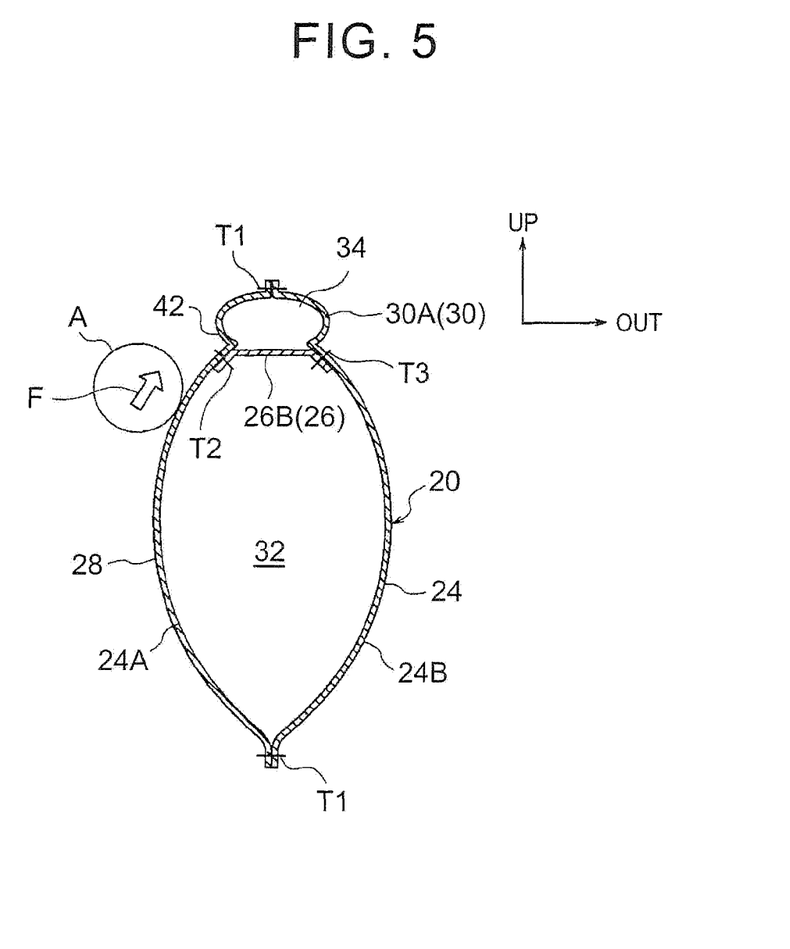
FIG. 5 is a reduced sectional view of a cross-section taken along line V-V in FIG. 2, in which the side airbag is in a completely inflated and deployed state.

Also, a recessed portion 42 is formed by an inside surface, in the vehicle width direction, of the side airbag 20 being recessed toward the outside in the vehicle width direction, near the upper partitioning portion 26B, as shown in FIG. 5. This recessed portion 42 extends upward at a forward angle with respect to the seat back 14 along the upper partitioning portion 26B. Also, the inside surface, in the vehicle width direction, of the front bag portion 28 is curved so as to rise higher as the side above the center portion in the up-down direction heads farther toward the outside in the vehicle width direction.

In this example embodiment, the side airbag 20 is formed by the base fabric 24 and the tether 26 being sewn, but the invention is not limited to this. The method by which the side airbag 20 is sewn is not particularly limited. For example, the side airbag may also be formed by a one piece woven construction method (a so-called OPW construction method) using an automatic loom.

Further, in this example embodiment, both the up-down partitioning portion 26A and the upper partitioning portion 26B are formed by the tether 26, but the invention is not limited to this. The up-down partitioning portion 26A may be formed by the tether 26, and the upper partitioning portion may be formed by a seam. Also, both the up-down partitioning portion 26A and the upper partitioning portion 26B may be formed by a seam. Furthermore, in this example embodiment, as shown in FIGS. 1 and 2, the up-down partitioning portion 26A and the upper partitioning portion 26B are set to deploy in a linear shape when viewed from the side, but the invention is not limited to this. That is, the up-down partitioning portion 26A and the upper partitioning portion 26B may also be made to deploy in an arc-like shape when viewed from the side.

Meanwhile, the inflator 22 is a so-called cylinder type inflator, and is formed in a circular cylindrical shape. This inflator 22 is arranged inside the rear bag portion 30, with the axial direction thereof in the height direction of the seat back 14. The inflator 22 is provided positioned near a center portion in the up-down direction in a rear end portion of the rear bag portion 30 when the side airbag 20 is in an inflated and deployed state.

A pair of upper and lower stud bolts 48 (see FIG. 3) protrudes toward the inside in the vehicle width direction from an outer peripheral portion of the inflator 22. These stud bolts 48 pass through the one side portion 24A of the base fabric 24 and a side frame 15A of the seat back frame 15, and nuts 50 are screwed onto tip end sides of the stud bolts 48. As a result, the inflator 22 is fastened (so-called "tightened from the side") to both the side airbag 20 and the side frame 15A. The stud bolts that protrude toward the vehicle rear side from the outer peripheral portion of the inflator 22 may also be passed, from the vehicle front side, through a bracket or the like that is fixed to the side frame 15A, and screwed into the nuts (so-called "tightened from behind").

A gas ejection port 22A is provided in a lower end portion of this inflator 22. When the inflator 22 is activated, gas is ejected from the gas ejection port 22A. A side collision ECU 52 mounted in the vehicle is electrically connected to the inflator 22, as shown in FIG. 1. A side collision sensor 54 that detects a side collision is electrically connected to this side collision ECU 52. The side collision ECU 52 is configured to activate the inflator 22 when a side collision is detected or when it is detected that a side collision is unavoidable) based on a signal from the side collision sensor 54. When a pre-crash sensor that anticipates (predicts) a side collision is electrically connected to the side collision ECU 52, the inflator 22 may be configured to activate when the side collision ECU 52 anticipates a side collision based on a signal from the pre-crash sensor.

The inflator 22 is covered by an inner tube (rectifying cloth) 56. This inner tube 56 is sewn in a cylindrical shape using the same cloth material as that of the base fabric 24 of the side airbag 20, and the inflator 22 is inserted inside of this inner tube 56. The pair of upper and lower stud bolts 48 of the inflator 22 pass through this inner tube 56, with the inner tube 56 sandwiched between the inflator 22 and the one side portion 24A of the base fabric 24.

This inner tube 56 serves to guide the gas ejected from the inflator 22 upward and downward by upper and lower openings (i.e., has a gas rectifying function) (see arrows G1 and G2 in FIG. 2). Gas G1 is ejected toward the shoulder restraining portion 30A on an upper portion of the rear bag portion 30, and gas G2 is ejected toward a lower portion (a hip restraining portion) of the rear bag portion 30. Furthermore, the gas G1 and G2 ejected inside the rear bag portion 30 is supplied to the front bag portion 28 through communication holes 36 and 38 in the up-down partitioning portion 26A (see arrows G3 and G4 in FIG. 2). Therefore, the internal pressure of the rear bag portion 30 is higher than the internal pressure of the front bag portion 28. That is, in this example embodiment, internal pressure regulating means that makes the internal pressure of the rear bag portion 30 higher than the internal pressure of the front bag portion 28 is formed by providing the inflator 22 in the rear bag portion 30, and forming the communication holes 36 and 38 in the vertical partitioning portion 26A.

Also, in this example embodiment, a pair of tacks 58 and 60 as inflation-suppressing sewn portions is applied to the shoulder restraining portion 30A of the rear bag portion 30, such that the one side portion 24A and the other side portion 24B of the base fabric 24 are tacked by these tacks 58 and 60. These tacks 58 and 60 extend linearly along the upper partitioning portion 26B (parallel to the upper partitioning portion 26B in this case) that is positioned between the front bag portion 28 and the shoulder restraining portion 30A, and are set lined up in a direction orthogonal to the length direction of the upper partitioning portion 26B. By setting these tacks 58 and 60, a plurality (three in this case) of gas flow paths 62, 63, and 64 that extend toward a tip end portion side of the shoulder restraining portion 30A are formed in the shoulder restraining portion 30A. As shown in FIGS. 1 and 2, these tacks 58 and 60 are set lined up in the length direction of the upper arm A sandwiching the center of the shoulder S, when the side airbag 20 in a partially inflated and deployed state is viewed from the vehicle width direction.

The tacks 58 and 60 are configured such that one end portions 58A and 60A that are positioned at on a tip end portion (the upper end portion here) of the shoulder restraining portion 30A are treated to inhibit fraying (i.e., undergo fraying inhibiting treatment), while the other end portions 58B and 60B that are positioned on the inflator 22 side of the one end portions 58A and 60A are not treated to inhibit fraying (i.e., have not undergone fraying inhibiting treatment). The other end portions 58B and 60B of the tacks 58 and 60 that are not treated to inhibit fraying are positioned on a base end portion (a lower end portion here) of the shoulder restraining portion 30A, and are positioned downstream, in the direction in which the gas G1 is supplied to the shoulder restraining portion 30A, of the one end portions 58A and 60A. This fraying inhibiting treatment is performed by backstitching, zigzag stitching, or a French knot, for example.

The tacks 58 and 60 start to fray progressively from the other end portions 58B and 60B that have not been treated to inhibit fraying, when the internal pressure of the rear bag portion 30 (here, the shoulder restraining portion 30A) becomes equal to or greater than a predetermined set value by the gas G1 and G2 from the inflator 22. Also, in this way, the timing at which the tacks 58 and 60 start to fray from the other end portion 58B and 60B side is set to be after the shoulder restraining portion 30A has deployed in the space between the shoulder S of the seated occupant P and the door trim 68. That is, as shown in FIG. 4, at the beginning of deployment of the shoulder restraining portion 30A, the inflated thickness in the vehicle width direction of the shoulder restraining portion 30A (hereinafter, simply referred to as "inflated thickness") is suppressed by a portion of the one side portion 24A and the other side portion 24B of the base fabric 24, which forms the shoulder restraining portion 30A, being kept sewn by the tacks 58 and 60. Also, as the tacks 58 and 60 start to fray from the other end portion 58B and 60B side, the inflated thickness of the shoulder restraining portion 30A increases from the base end portion side of the shoulder restraining portion 30A, and when the tacks 58 and 60 fray to the one end portions 58A and 60A, the shoulder restraining portion 30A will be completely inflated (see the chain double dash line in FIG. 4).

(Operation and Effects)

Next, the operation and effects of the first example embodiment will be described.

With the vehicle side airbag device 10 having the structure described above, when the side collision ECU 52 detects a side collision from a signal from the side collision sensor 54, the inflator 22 is activated by the side collision ECU 52. When this happens, gas ejected from the inflator 22 is ejected from the upper end opening of the inner tube 56 toward the shoulder restraining portion 30A of the rear bag portion 30, and is ejected from the lower end opening of the inner tube 56 toward the lower portion of the rear bag portion 30. Moreover, gas ejected into the rear bag portion 30 is supplied to the front bag portion 28 through the communication holes 36 and 38 in the up-down partitioning portion 26A. As a result, the side airbag 20 inflates and deploys between the seated occupant P and the door trim 68, and the shoulder restraining portion 30A at the upper portion of the rear bag portion 30 is interposed between the shoulder S of the seated occupant P and the door trim 68.

Here, the tacks 58 and 60 are applied at the shoulder restraining portion 30A of the rear bag portion 30, and when the internal pressure of the rear bag portion 30 rises to equal to or greater than a set value, the tacks 58 and 60 will fray, such that the inflated thickness of the shoulder restraining portion 30A will expand. That is, until the tacks 58 and 60 fray, the inflated thickness and capacity of the shoulder restraining portion 30A are small, so the shoulder restraining portion 30A is able to be deployed particularly well in the narrow space between the shoulder S of the seated occupant P and the door trim 68. As a result, good deployment performance of the side airbag 20 is able to be ensured. Moreover, the effects described above are able to be obtained with a simple structure in which the inflation-suppressing tacks 58 and 60 are applied to the shoulder restraining portion 30A of the rear bag portion 30, so the structure of the side airbag 20 is able to be simplified.

In addition, in this example embodiment, the tacks 58 and 60 are configured such that the one end portions 58A and 60A positioned on the tip end portion of the shoulder restraining portion 30A are treated to inhibit fraying (fraying inhibiting treatment), while the other end portions 58B and 60B positioned on the inflator 22 side of the one end portions 58A and 60A are not treated to inhibit fraying. Therefore, the tacks 58 and 60 start to fray from the other end portions 58B and 60B positioned on the inflator 22 side of the one end portions 58A and 60A that are positioned on the tip end portion of the shoulder restraining portion 30A. Setting the tacks 58 and 60 in this way makes it possible to delay the inflation on the tip end portion side of the shoulder restraining portion 30A, so the tip end portion side of the shoulder restraining portion 30A that is in the middle of deploying is able to be prevented or effectively inhibited from inadvertently interfering with the shoulder S.

Furthermore, in this example embodiment, the gas flow paths 62, 63, and 64 that extend toward the tip end portion side of the shoulder restraining portion 30A are formed in the shoulder restraining portion 30A by setting the tacks 58 and 60 along the upper partitioning portion 26B. As a result, gas from the inflator 22 is able to be better led to the tip end portion side of the shoulder restraining portion 30A by the gas flow paths 62, 63, and 64, so the shoulder restraining portion 30A is able to be deployed between the shoulder S and the door trim 68 early.

Also, in this example embodiment, the shoulder restraining portion 30A of the rear bag portion 30 separated from the front bag portion 28 by the upper partitioning portion 26B that extends from the upper end of the up-down partitioning portion 26A, upward at a forward angle with respect to the seat back 14, and inflates and deploys toward the side above the front bag portion 28. That is, by setting the upper partitioning portion 26B that extends forward and upward with in the longitudinal (front-rear) direction of the seat back 14, the upper portion (i.e., the shoulder restraining portion 30A) of the rear bag portion 30 extends toward the vehicle front side on the upper side of the front bag portion 28 and restrains the shoulder S of the seated occupant P. Setting the upper partitioning portion 26B in this way enables the restraining area of the shoulder S by the shoulder restraining portion 30A to expand well, while increasing the capacity of the rear bag portion 30.

Furthermore, as shown in FIG. 5, inflation of an area near the upper partitioning portion 26B is inhibited when the side airbag is in an inflated and deployed state. As a result, the inside surface, in the vehicle width direction, of the inflated and deployed front bag portion 28 curves, rising as the side above the center portion in the up-down direction heads toward the outside in the vehicle width direction. Therefore, when the side airbag 20 and the seated occupant P become closer together due to the impact of a side collision, this curved surface consequently slidingly contacts the upper arm A of the seated occupant P, such that a force F that pushes the upper arm A upward is generated. As a result, the upper arm A is pushed up above the front bag portion 28 and is restrained by the shoulder restraining portion 30A. Thus, the upper arm A is able to be inhibited from being interposed between the chest C of the seated occupant P and the side airbag 20, so a load on the chest C is able to be reduced.

Also, in this example embodiment, the upper partitioning portion 26B is positioned near the center between the center of the shoulder S of the seated occupant P and the center portion, in the length direction, of the upper arm A (i.e., near the center of gravity AC of the upper arm A), when the side airbag 20 in an inflated and deployed state is viewed from the vehicle width direction. Therefore, compared to when the upper partitioning portion 26B is set near the center of gravity AC of the upper arm A, the pushing force F on the upper arm A by the front bag portion 28 is able to be better applied near the center of gravity AC of the upper arm A. As a result, the upper arm A is able to be effectively pushed up.

Also, in this example embodiment, the up-down partitioning portion 26A is set so as to extend in the up-down direction of the seat back along the longitudinal center portion of the chest C and abdomen B of the seated occupant P, when the side airbag 20 in an inflated and deployed state is viewed from the vehicle width direction. Therefore, the side surfaces of the chest C and the abdomen B of the seated occupant P are able to be restrained so as to be covered from the front and rear along the curvatures of those side surfaces, by the front bag portion 28 and the rear bag portion 30. Thus, the positional relationships in the vehicle longitudinal direction among the chest C, the abdomen B, and the side airbag 20, are able to be stabilized.

Furthermore, in this example embodiment, when the side airbag 20 inflates and deploys, the inside surface in the vehicle width direction of the side airbag 20 becomes recessed toward the outside in the vehicle width direction near the up-down partitioning portion 26A and the upper partitioning portion 26B. A longitudinally center portion of a side surface of the chest C (i.e., a portion that extends the farthest toward the outside in the vehicle width direction) fits into the recessed portion 40 formed near the up-down partitioning portion 26A. Thus, the load on the chest C (e.g., the ribs and the like) is able to be reduced. Also, the upper arm A that has been pushed upward by the sliding contact with the front bag portion 28 fits into the recessed portion 42 formed near the upper partitioning portion 26B. Thus, the upper arm A is able to be better restrained at the position where it has been pushed up.

Also, in this example embodiment, the up-down partitioning portion 26A and the upper partitioning portion 26B are formed by the tether 26, so the inflated thickness (i.e., the dimension in the vehicle width direction in an inflated and deployed state) of the front bag portion 28 and the rear bag portion 30 are able to be increased by only the amount of the width dimension of the tether 26. As a result, the impact absorption stroke of the front bag portion 28 and the rear bag portion 30 is able to be better ensured.

Next, another example embodiment of the invention will be described. Structure and operation that are basically the same as those of the first example embodiment will be denoted by the same reference characters as they are in the first example embodiment, and descriptions thereof will be omitted.

Second Example Embodiment

Figure 6:
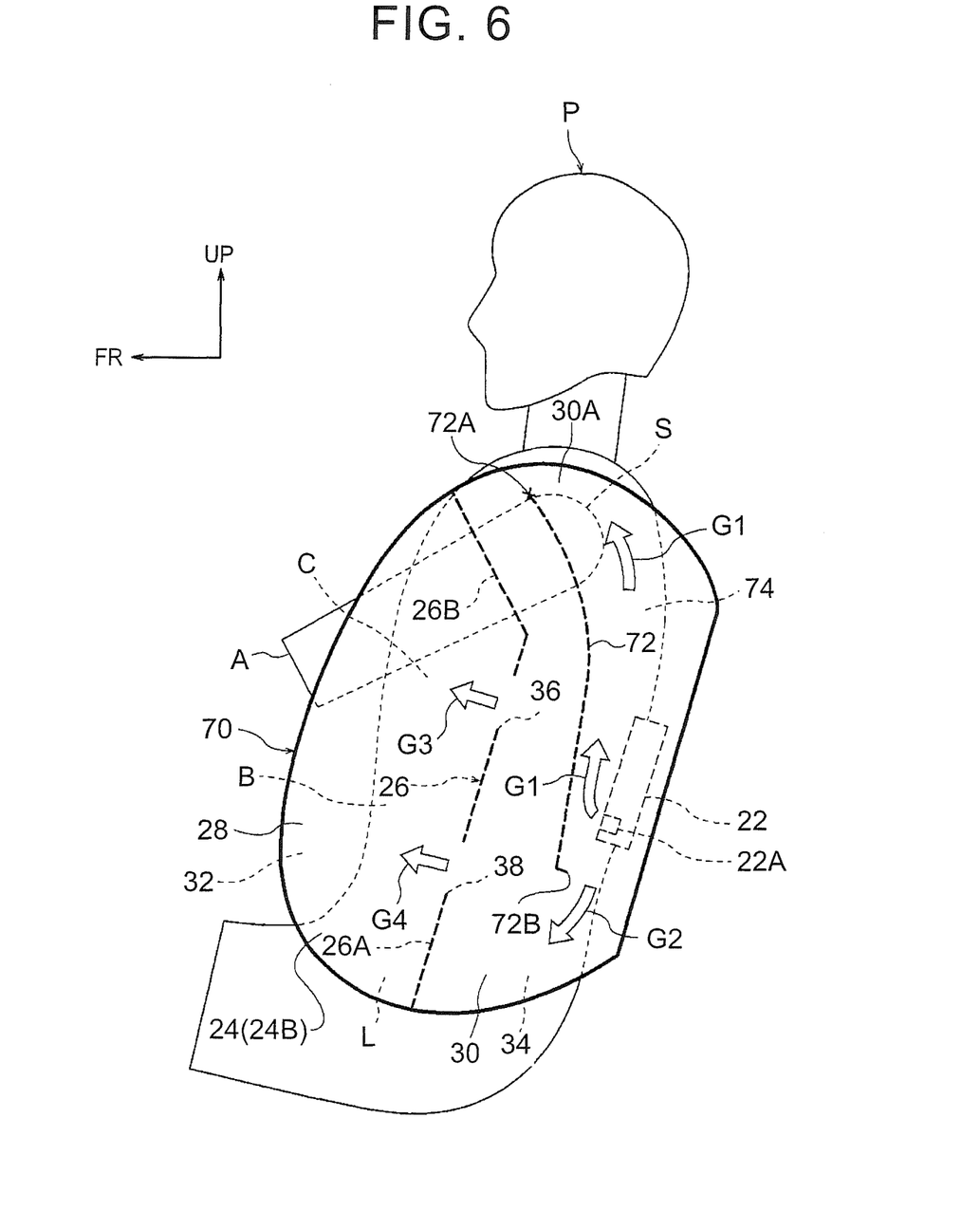
FIG. 6 is a side view of a side airbag that is a structural member of a vehicle side airbag device according to a second example embodiment of the invention, in which the side airbag is in a partially inflated and deployed state.

FIG. 6 is a side view of a side airbag 70 of a vehicle side airbag device according to a second example embodiment of the invention, shown in a partially inflated and deployed state. With this side airbag 70, the structure of a tack 72 that serves as an inflation-suppressing sewn portion differs from that of the tacks 58 and 60 of the first example embodiment. Also, the inner tube 56 in the first example embodiment is omitted. The other structure is the same as that of the first example embodiment.

The tack 72 is such that one end portion 72A (an upper end portion) that has been treated to inhibit fraying is positioned on a tip end portion of the shoulder restraining portion 30A, and the other end portion 72B (a lower end portion) that has not been treated to inhibit fraying is positioned on a lower portion side of the rear bag portion 30. That is, the tack 72 is applied in a region that includes the shoulder restraining portion 30A of the rear bag portion 30. The one side portion 24A and the other side portion 24B of the base fabric 24 are sewn by this tack 72. The other end portion 72B of the tack 72 is positioned lower than the inflator 22, in front of inflator 22. A gas flow path 74 that extends from the inflator 22 to a tip end portion of the shoulder restraining portion 30A is formed on a rear portion side of the rear bag portion 30 as a result of this tack 72 being set.

The tack 72 is configured such that when the internal pressure of the rear bag portion 30 becomes equal to or greater than a preset value due to the gas from the inflator 22, the tack 72 will start to fray progressively from the other end portion 72B side that has not been treated to inhibit fraying. Also, the timing at which the tack 72 starts to fray from the other end portion 72B is set to be after the shoulder restraining portion 30A has deployed in the space between the shoulder S of the seated occupant P and the door trim 68, similar to the first example embodiment. As a result, basically the same operation and effects as those obtained with the first example embodiment are able to be displayed.

Moreover, in this example embodiment, gas from the inflator 22 is able to be better led to the shoulder restraining portion 30A by the gas flow path 74 (see arrow G1 in FIG. 6), so the shoulder restraining portion 30A is able to be deployed between the shoulder S of the seated occupant P and the door trim 68 early. Also, the rear portion side of the rear bag portion 30 where the gas flow path 74 is provided inflates and deploys early, so the back side (i.e., the side where the back of the seated occupant P is located) where the load tolerance is higher than the front side, of the side portion of the upper body of the seated occupant P is able to be restrained early by the rear bag portion 30. Therefore, the initial restraint performance of a seated occupant by the side airbag is able to be improved. Also, the upper body of the seated occupant P is able to be rotated in a direction in which the seated occupant P turns his or her back to the door trim 68, so the load from the side airbag 70 on the front of the chest C and abdomen B where the load tolerance is low is able to be even more effectively reduced.

Third Example Embodiment

Figure 7:
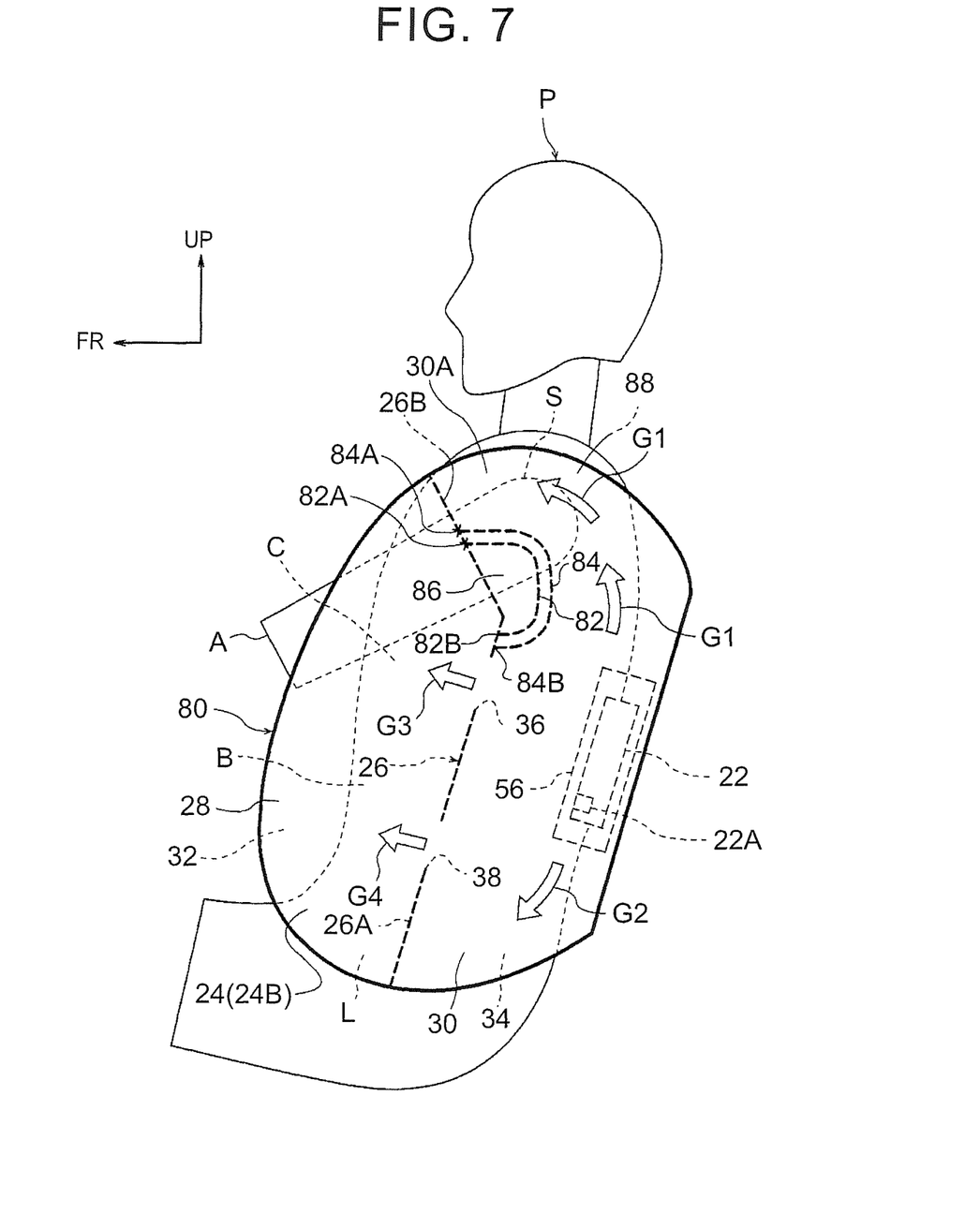
FIG. 7 is a side view of a side airbag that is a structural member of a vehicle side airbag device according to a third example embodiment of the invention, in which the side airbag is in a partially inflated and deployed state.

FIG. 7 is a side view of a side airbag 80 of a vehicle side airbag device according to a third example embodiment of the invention, shown in a partially inflated and deployed state. With this side airbag 80, the structure of tacks 82 and 84 that serve as inflation-suppressing sewn portions differs from that of the tacks 58 and 60 of the first example embodiment. The other structure is the same as that of the first example embodiment.

The tacks 82 and 84 extend toward the rear end side of the side airbag 80 from one end portions 82A and 84A that are positioned near a middle portion in the length direction of the upper partitioning portion 26B, and curve downward near a middle portion in the front-rear direction of the side airbag 80. Further, the tacks 82 and 84 curve toward a front end side of the side airbag 80 at the same height as the upper end portion of the up-down partitioning portion 26A, and the other end portions 82B and 84B reach the upper end portion of the up-down partitioning portion 26A. As a result, an inflation suppressing region that is surrounded by the tacks 82 and 84 and the tether 26 are formed, and a gas flow path 88 is formed on an upper side of the inflation suppressing region 86 such that gas from the inflator 22 flows from the upper portion to the front portion of the shoulder restraining portion 30A.

The tacks 82 and 84 are configured such that upper end portions 82A and 84A positioned on the shoulder restraining portion 30A are treated to inhibit fraying (i.e., have undergone fraying inhibiting treatment), while the other end portions 82B and 84B positioned on the inflator 22 side of the one end portions 82A and 84A are not treated to inhibit fraying (i.e., have not undergone fraying inhibiting treatment). Also, the timing at which the tacks 82 and 84 start to fray from the other end portion 82B and 84B is set to be after the shoulder restraining portion 30A has deployed in the space between the shoulder S of the seated occupant P and the door trim 68, similar to the first example embodiment. As a result, basically the same operation and effects as those obtained with the first example embodiment are able to be displayed.

Moreover, in this example embodiment, in this example embodiment, the supply of gas into the inflation suppressing region 86 is inhibited until these tacks 82 and 84 start to fray, so the capacity of the rear bag portion 30 is able to be reduced. In addition, the gas from the inflator 22 is supplied from the upper portion to the front portion of the shoulder restraining portion 30A through the gas flow path 88 formed on the upper side of the inflation suppressing region 86, so the shoulder restraining portion 30A is able to be deployed between the shoulder S and the door trim 68 early.

Supplemental Description of the Example Embodiments

In the first and third example embodiments, the side airbag 20 and 80 includes the inner tube 56, but the invention in not limited to this. That is, the inner tube 56 may also be omitted.

Also, in each of the example embodiments described above, the pair of upper and lower communication holes 36 and 38 are formed in the tether 26 that is a partitioning portion, but the invention is not limited to this. That is, the number and positions of the communication holes that communicate the front bag portion with the rear bag portion may be changed as appropriate.

Also, in each of the example embodiments described above, the tacks 58, 60, 72, 82, and 84 that serve as inflation-suppressing sewn portions are configured to fray by an increase in the internal pressure of the rear bag portion 30, but the invention is not limited to this. That is, a tear seam (a weak sewn portion) as the inflation-suppressing sewn portion may be configured to tear due to an increase in the internal pressure of the rear bag portion 30.

Also, in each of the example embodiments described above, the side airbag 20, 70, and 80 is partitioned into the front bag portion 28 and the rear bag portion 30, but the invention is not limited to this. That is, the front bag portion and the rear bag portion may also be configured such that a partitioned lower bag portion is provided in a lower portion of the side airbag, and the hip of the seated occupant is restrained by this lower bag portion.

Also, in each of the example embodiments described above, the upper partitioning portion 26B extends upward at a forward angle with respect to the seat back 14 when the side airbag 20 is in an inflated and deployed state, but the invention is not limited to this. That is, the upper partitioning portion 26B may also extend in the front-rear direction of the seat back 14.

Furthermore, the invention may also be carried out in modes that have been modified in any of a variety of ways without departing from the scope thereof. Also, it is to be understood that the scope of the invention is not limited to the example embodiments described above.

What is claimed is:

1. A vehicle side airbag device comprising:
an inflator that is provided in a side portion on an outside, in a vehicle width direction, of a seat back of a vehicle seat, and that generates gas by being activated when a side collision of a vehicle is detected or anticipated; and
a side airbag that is provided in the side portion, and that has a front bag portion and a rear bag portion that are partitioned by a partitioning portion extending in an up-down direction along the side airbag, the side airbag being inflated and deployed by the gas from the inflator that is housed in a rear portion inside the rear bag portion being supplied into each bag portion, a shoulder restraining portion provided in an upper portion of the rear bag portion extending toward a vehicle front side on an upper side of the front bag portion and being interposed between a shoulder of a seated occupant and a vehicle body side portion, and an inflated thickness in the vehicle width direction of a region that includes the shoulder restraining portion of the rear bag portion being expanded by an inflation-suppressing sewn portion applied to the region fraying or tearing due to an increase in internal pressure of the rear bag portion.

2. The vehicle side airbag device according to claim 1, wherein the inflation-suppressing sewn portion is a tack in which one end portion thereof that is positioned on the shoulder restraining portion is treated to inhibit fraying, while the other end portion thereof that is positioned on the inflator side of the one end portion is not treated to inhibit fraying.

3. The vehicle side airbag device according to claim 2, wherein the one end portion of the inflation-suppressing sewn portion is positioned on a tip end portion of the shoulder restraining portion.

4. The vehicle side airbag device according to claim 2, wherein the inflation-suppressing sewn portion is configured such that when the internal pressure of the rear bag portion becomes equal to or greater than a preset value by the gas from the inflator, the inflation-suppressing sewn portion starts to fray progressively from the other end portion side that is not treated to inhibit fraying.

5. The vehicle side airbag device according to claim 4, wherein the preset value is set such that the inflation-suppressing sewn portion will fray after the shoulder restraining portion deploys between the shoulder of the seated occupant and a door trim.

6. The vehicle side airbag device according to claim 1, wherein the inflation-suppressing sewn portion is set along an upper partitioning portion that is positioned between the shoulder restraining portion and the front bag portion, of the partitioning portion.

7. The vehicle side airbag device according to claim 6, wherein a pair of the inflation-suppressing sewn portions extends parallel to the upper partitioning portion, and is set lined up in a direction orthogonal to the length direction of the upper partitioning portion.

8. The vehicle side airbag device according to claim 1, wherein the inflation-suppressing sewn portion forms a gas flow path that extends from the inflator to the shoulder restraining portion, on a rear portion side of the rear bag portion.

9. The vehicle side airbag device according to claim 1, wherein the inflation-suppressing sewn portion forms an inflation suppressing region that protrudes from the partitioning portion toward a side opposite the front bag portion, and forms a gas flow path on an upper side of the inflation suppressing region such that the gas from the inflator flows from an upper portion toward a front portion of the shoulder restraining portion.

10. The vehicle side airbag device according to claim 1, wherein an upper partitioning portion that is positioned between the shoulder restraining portion and the front bag portion, of the partitioning portion, is set so as to extend upward at a forward angle with respect to the seat back when the side airbag is in the inflated and deployed state.

11. The vehicle side airbag device according to claim 1, wherein one end portion of the inflation-suppressing sewn portion is positioned on the shoulder restraining portion, and a space is provided between the one end portion of the inflation-suppressing sewn portion and a seam in an outer peripheral edge portion of the side airbag.

12. A vehicle side airbag device comprising:
an inflator that is provided in a side portion on an outside, in a vehicle width direction, of a seat back of a vehicle seat, and that generates gas by being activated when a side collision of a vehicle is detected or anticipated; and
a side airbag that is provided in the side portion, and that has a front bag portion and a rear bag portion that are partitioned by a partitioning portion, the side airbag being inflated and deployed by the gas from the inflator that is housed in a rear portion inside the rear bag portion being supplied into each bag portion, a shoulder restraining portion provided in an upper portion of the rear bag portion extending toward a vehicle front side on an upper side of the front bag portion and being interposed between a shoulder of a seated occupant and a vehicle body side portion, and an inflated thickness in the vehicle width direction of a region that includes the shoulder restraining portion of the rear bag portion being expanded by an inflation-suppressing sewn portion applied to the region fraying or tearing due to an increase in internal pressure of the rear bag portion, the inflation-suppressing sewn portion being a tack in which one end portion thereof that is positioned on the shoulder restraining portion is treated to inhibit fraying and an another end portion thereof is positioned on the inflator side of the one end portion is not treated to inhibit fraying.

13. The vehicle side airbag device according to claim 12, wherein the one end portion of the inflation-suppressing sewn portion is positioned on a tip end portion of the shoulder restraining portion.

14. The vehicle side airbag device according to claim 12, wherein the inflation-suppressing sewn portion is configured such that when the internal pressure of the rear bag portion becomes equal to or greater than a preset value by the gas from the inflator, the inflation-suppressing sewn portion starts to fray progressively from the other end portion side that is not treated to inhibit fraying.

15. The vehicle side airbag device according to claim 14, wherein the preset value is set such that the inflation-suppressing sewn portion will fray after the shoulder restraining portion deploys between the shoulder of the seated occupant and a door trim.

16. The vehicle side airbag device according to claim 12, wherein the inflation-suppressing sewn portion is set along an upper partitioning portion that is positioned between the shoulder restraining portion and the front bag portion, of the partitioning portion.

17. The vehicle side airbag device according to claim 16, wherein a pair of the inflation-suppressing sewn portions extends parallel to the upper partitioning portion, and is set lined up in a direction orthogonal to the length direction of the upper partitioning portion.

18. A vehicle side airbag device comprising:
an inflator that is provided in a side portion on an outside, in a vehicle width direction, of a seat back of a vehicle seat, and that generates gas by being activated when a side collision of a vehicle is detected or anticipated; and
a side airbag that is provided in the side portion, and that has a front bag portion and a rear bag portion that are partitioned by a partitioning portion, the side airbag being inflated and deployed by the gas from the inflator that is housed in a rear portion inside the rear bag portion being supplied into each bag portion, a shoulder restraining portion provided in an upper portion of the rear bag portion extending toward a vehicle front side on an upper side of the front bag portion and being interposed between a shoulder of a seated occupant and a vehicle body side portion, and an inflated thickness in the vehicle width direction of a region that includes the shoulder restraining portion of the rear bag portion being expanded by an inflation-suppressing sewn portion applied to the region fraying or tearing due to an increase in internal pressure of the rear bag portion, the inflation-suppressing sewn portion having one end portion that is positioned on the shoulder restraining portion, and a space is provided between the one end portion of the inflation-suppressing sewn portion and a seam in an outer peripheral edge portion of the side airbag.

19. The vehicle side airbag device according to claim 18, wherein the one end portion of the inflation-suppressing sewn portion is positioned on a tip end portion of the shoulder restraining portion.

20. The vehicle side airbag device according to claim 18, wherein the inflation-suppressing sewn portion is configured such that when the internal pressure of the rear bag portion becomes equal to or greater than a preset value by the gas from the inflator, the inflation-suppressing sewn portion starts to fray progressively from the other end portion side that is not treated to inhibit fraying.

* * * * *